(12) United States Patent
Levi et al.

(10) Patent No.: US 11,853,116 B2
(45) Date of Patent: Dec. 26, 2023

(54) CLOCK ERROR-BOUND TRACKER

(71) Applicant: MELLANOX TECHNOLOGIES, LTD., Yokneam (IL)

(72) Inventors: Dotan David Levi, Kiryat Motzkin (IL); Wojciech Wasko, Mlynek (PL); Eitan Zahavi, Zichron Yaakov (IL); Natan Manevich, Ramat HaSharon (IL); Bar Shapira, Tel-Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 137 days.

(21) Appl. No.: 17/582,058

(22) Filed: Jan. 24, 2022

(65) Prior Publication Data
US 2023/0236624 A1 Jul. 27, 2023

(51) Int. Cl.
G06F 1/14 (2006.01)
H04J 3/06 (2006.01)
G06F 1/12 (2006.01)

(52) U.S. Cl.
CPC .............. *G06F 1/14* (2013.01); *G06F 1/12* (2013.01); *H04J 3/0661* (2013.01); *H04J 3/0679* (2013.01); *H04J 3/0682* (2013.01); *H04J 3/0697* (2013.01)

(58) Field of Classification Search
CPC .. G06F 1/14; G06F 1/12; H04J 3/0661; H04J 3/0679; H04J 3/0682; H04J 3/0697
See application file for complete search history.

(56) References Cited

U.S. PATENT DOCUMENTS

| | | | |
|---|---|---|---|
| 2015/0263966 A1* | 9/2015 | Blake | H04L 47/562 370/229 |
| 2016/0072513 A1* | 3/2016 | Dickerson | H03L 7/26 331/16 |
| 2018/0011199 A1* | 1/2018 | Lombardi | G01S 19/14 |
| 2021/0141413 A1* | 5/2021 | Levi | G06F 1/14 |
| 2021/0385058 A1* | 12/2021 | Guignard | H04L 7/0008 |
| 2023/0185600 A1* | 6/2023 | Wasko | G06F 9/485 710/260 |

OTHER PUBLICATIONS

"IEEE Standard for a Precision Clock Synchronization Protocol for Networked Measurement and Control Systems", pp. 1-289, Jul. 24, 2008.

Li et al., "Sundial: Fault-Tolerant Clock Synchronization for Datacenters," Proceedings of the 14th USENIX Symposium on Operating Systems Design and Implementation, Open Access Version, USENIX Association, pp. 1170-1186, year 2020.

* cited by examiner

*Primary Examiner* — Glenn A. Auve
(74) *Attorney, Agent, or Firm* — KLIGLER & ASSOCIATES PATENT ATTORNEYS LTD (57) ABSTRACT

In one embodiment, a device includes a hardware clock to maintain a clock value, a hardware counter to maintain an estimation of a dynamic error bound of the clock value, and a clock controller to intermittently discipline the hardware clock responsively to a remote clock, advance the hardware counter at a rate responsively to a clock drift, and adjust the hardware counter responsively to the hardware clock being disciplined.

21 Claims, 6 Drawing Sheets

CLOCK ERROR-BOUND TRACKER

FIELD OF THE INVENTION

The present invention relates to computer devices, and in particular, but not exclusively, clock values.

BACKGROUND

Clock synchronization among network devices is used in many network applications. One application of using a synchronized clock value is for measuring latency between two devices. If the clocks are not synchronized the resulting latency measurement will be inaccurate.

A publication entitled "Sundial: Fault-tolerant Clock Synchronization for Datacenters" by Li, et al., discusses the critical nature of clock synchronization for many applications including datacenter applications such as distributed transactional databases, consistent snapshots, and network telemetry. The publication explains that as applications have increasing performance requirements and datacenter networks get into ultra-low latency, there is a need for sub-microsecond level bound on time-uncertainty to reduce transaction delay and enable new network management applications (e.g., measuring one-way delay for congestion control). The state-of-the-art clock synchronization solutions focus on improving clock precision but may incur significant time-uncertainty bound due to the presence of failures. The publication further explains that this significantly affects applications because in large-scale datacenters, temperature-related, link, device, and domain failures are common.

SUMMARY

There is provided in accordance with an embodiment of the present disclosure, a device, including a hardware clock to maintain a clock value, a hardware counter to maintain an estimation of a dynamic error bound of the clock value, and a clock controller to intermittently discipline the hardware clock responsively to a remote clock, advance the hardware counter at a rate responsively to a clock drift, and adjust the hardware counter responsively to the hardware clock being disciplined.

Further in accordance with an embodiment of the present disclosure the clock controller is configured to reset the hardware counter to a given value responsively to the hardware clock being disciplined.

Still further in accordance with an embodiment of the present disclosure the clock controller is configured to apply a correction to the clock value over time responsively to a correction from the remote clock, and adjust the hardware counter over time responsively to the hardware clock being corrected by the correction over time.

Additionally in accordance with an embodiment of the present disclosure the clock controller is configured to adjust the hardware counter over time responsively to a method used to obtain the remote clock.

Moreover, in accordance with an embodiment of the present disclosure, the device includes an oscillator to drive the hardware clock, wherein the clock controller is configured to advance the hardware counter at the rate responsively to a given drift of the oscillator.

Further in accordance with an embodiment of the present disclosure, the device includes a temperature sensor to measure a temperature of the oscillator, wherein the clock controller is configured to advance the hardware counter at the rate responsively to the given drift of the oscillator and the temperature of the oscillator.

Still further in accordance with an embodiment of the present disclosure the clock controller is configured to advance the hardware counter at the rate responsively to the given drift of the oscillator and the age of the oscillator.

Additionally in accordance with an embodiment of the present disclosure, the device includes an accelerometer to measure movement, wherein the clock controller is configured to advance the hardware counter at the rate responsively to the given drift of the oscillator and the measured movement.

Moreover in accordance with an embodiment of the present disclosure, the device includes packet processing circuitry to process an event, retrieve the clock value from the hardware clock in response to the processing of the event, generate a timestamp responsively to the retrieved clock value, retrieve the estimation of the dynamic error bound of the clock value from the hardware counter in response to the processing of the event, and provide the timestamp and the retrieved estimation of the dynamic error bound to an application running on a processor.

Further in accordance with an embodiment of the present disclosure, the device includes a network interface to receive a packet, wherein the event includes receiving the packet.

Still further in accordance with an embodiment of the present disclosure, the device includes packet processing circuitry to process a transactional packet, retrieve the clock value from the hardware clock, generate a timestamp responsively to the retrieved clock value, retrieve the estimation of the dynamic error bound of the clock value from the hardware counter, and provide the timestamp and the retrieved estimation of the dynamic error bound to an application configured to process the transactional packet on a remote processor, and a network interface to send the transactional packet, the timestamp, and the retrieved estimation of the dynamic error bound to the remote processor.

Additionally in accordance with an embodiment of the present disclosure the clock controller is configured to perform a given action responsively to the estimation of the dynamic error bound of the clock value exceeding a given threshold.

Moreover, in accordance with an embodiment of the present disclosure the clock controller is configured to receive clock synchronization data from the remote clock indicative of a given clock value to which to discipline the hardware clock, and select a different master clock responsively to the given clock value being outside of a range defined by the clock value of the hardware clock plus and minus the estimation of the dynamic error bound of the clock value.

Further in accordance with an embodiment of the present disclosure the clock controller is configured to receive clock synchronization data from the remote clock indicative of a given clock value to which to discipline the hardware clock, and adjust the rate of advancing the hardware counter responsively to the given clock value being outside of a range defined by the clock value of the master clock plus and minus the estimation of the dynamic error bound of the clock value.

Still further in accordance with an embodiment of the present disclosure the clock controller is configured to time sending of clock synchronization packets responsively to the estimation of the dynamic error bound of the clock value being less than a given threshold.

Additionally in accordance with an embodiment of the present disclosure the clock controller is configured to self-evict from being a master clock responsively to the estimation of the dynamic error bound of the clock value exceeding a given threshold.

Moreover, in accordance with an embodiment of the present disclosure the clock controller is configured to enter holdover autonomously to maintain the hardware clock responsively to the estimation of the dynamic error bound of the clock value exceeding a given threshold.

Further in accordance with an embodiment of the present disclosure the clock controller is configured to retrieve the clock value from the hardware clock, retrieve the estimation of the dynamic error bound of the clock value from the hardware counter, and generate a clock synchronization packet responsively to the retrieved clock value and the retrieved estimation of the dynamic error bound, the device further including a network interface configured to send the clock synchronization packet to a slave device.

There is also provided in accordance with another embodiment of the present disclosure, a method, including maintaining a clock value of a hardware clock, maintaining an estimation of a dynamic error bound of the clock value using a hardware counter, intermittently disciplining the hardware clock responsively to a remote clock, advancing the hardware counter at a rate responsively to a clock drift, and adjusting the hardware counter responsively to the hardware clock being disciplined.

There is also provided in accordance with still another embodiment of the present disclosure, a multi-host system, including multiple host devices including respective processors to run respective applications, and a peripheral device to be connected to the multiple host devices, and including a hardware clock to maintain a clock value, a hardware counter to maintain an estimation of a dynamic error bound of the clock value, and a clock controller to intermittently discipline the hardware clock responsively to a remote clock, advance the hardware counter at a rate responsively to a clock drift, and adjust the hardware counter responsively to the hardware clock being disciplined.

Still further in accordance with an embodiment of the present disclosure the peripheral device further includes processing circuitry to process respective events, retrieve respective clock values from the hardware clock in response to the processing of the respective events, generate respective timestamps responsively to the retrieved respective clock values, retrieve respective estimations of the dynamic error bound of the respective clock values from the hardware counter in response to the processing of the respective events, and provide the respective timestamps and the respective retrieved estimations of the dynamic error bound to the respective applications running on the respective processors of the respective hosts.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

As previously mentioned, state-of-the-art clock synchronization solutions focus on improving clock precision but may incur significant time-uncertainty bound (or error bound) due to the presence of failures.

Embodiments of the present invention, solve at least some of the problems by providing a hardware counter to maintain an estimation of the error-bound of a clock value maintained by a hardware clock. The hardware counter is advanced (e.g., incremented) at a rate based on drift of the clock value and adjusted (e.g., decremented or reset) based on the clock being disciplined.

For example, if the estimated drift of the clock value is X nanoseconds per clock tick, then the hardware counter is incremented by X per clock tick. The value of the hardware counter may be reset (e.g., to a base value, such as Y) when the hardware clock is disciplined to the clock value of a remote clock. The hardware counter is then incremented from the base value (e.g., of Y) by X per clock tick until the next reset, and so on. In some cases where the hardware clock is adjusted over time responsively to the clock value of the remote clock, the hardware counter may be decremented over time corresponding to the adjustment of the clock value over time in addition to being incremented by X per tick over the same time period. For example, if the hardware counter has a value of P when the remote clock is received, and the hardware clock is adjusted over Q ticks of the hardware clock, then the hardware counter is reduced, per tick, by:

$$\frac{P-Y}{Q} - X$$

In some embodiments, the rate at which the hardware counter is incremented is based on a drift of an oscillator driving the hardware clock. The maximum drift of the oscillator may be specified in the data sheet of the oscillator or measured in a laboratory under extreme temperature conditions.

The behavior of the oscillator may also depend upon the temperature of the oscillator. Therefore, in some embodiments, a temperature sensor is placed near the oscillator to measure the temperature of the oscillator. The measured temperature may then be used to dynamically adjust the rate at which the hardware counter is incremented based on the drift of the oscillator at the measured temperature. The data sheet of the oscillator may describe the behavior of the oscillator at different temperatures. Alternatively, the behavior of the oscillator at different temperatures may be analyzed.

The behavior of the oscillator may also depend upon the age of the oscillator. Therefore, in some embodiments, the age of the oscillator may then be used to dynamically adjust the rate at which the hardware counter is incremented based on the drift of the oscillator at that age. The data sheet of the oscillator may also describe the behavior of the oscillator at different ages.

The behavior of the oscillator may also depend upon vibration of the oscillator. Therefore, in some embodiments, a movement sensor such as an accelerometer may measure movement (e.g., acceleration or vibration) of the oscillator. The movement (e.g., an average or standard deviation of the movement) of the oscillator may then be used to dynamically adjust the rate at which the hardware counter is incremented based on the movement of the oscillator. The data sheet of the oscillator may also describe the behavior of the oscillator at different vibrations. Alternatively, the behavior of the oscillator at different vibrations may be analyzed.

The estimation of dynamic error bound maintained by the hardware counter may be used for different applications. In one application, the estimation of dynamic error bound is monitored, and if the estimation of dynamic error bound exceeds a threshold, an action is performed, for example, self-evicting from being a master clock or entering holdover autonomously to maintain the hardware clock. In one application, sending of clock synchronization messages may be timed to times when the estimation of dynamic error bound is less than a given threshold thereby providing more accurate clock synchronization messages.

In one application, the clock value and the estimation of dynamic error bound may be atomically retrieved from the hardware clock and hardware counter, respectively, responsively to processing of an event, such as a packet being received, a packet being sent, a transactional packet being processed, a counter reaching a certain value, a counter that counts packets which meet a given criteria exceeding a threshold, or a buffer exceeding a threshold. The retrieved clock value and the retrieved estimation of dynamic error bound are then provided to an application running on a processor (e.g., of a host or a remote host or a data processing unit (DPU), which includes NIC circuitry, a network interface, and one or more processing cores.).

In one application, the clock value and the estimation of dynamic error bound may be retrieved from the hardware clock and hardware counter, respectively, to generate a clock synchronization packet. The retrieved clock value and the retrieved estimation of dynamic error bound are then added to the clock synchronization packet, which is provided to a slave (clock) device.

In one application, a different master clock may be selected to discipline the hardware clock if the clock value received from the current master clock (adjusted for time of flight from the master clock) is outside a range of the clock value of the hardware clock plus and minus the estimation of dynamic error bound retrieved from the hardware counter.

In one application, the rate at which the hardware counter is advanced may be adjusted if the clock value received from a remote clock (adjusted for time of flight from the remote clock) is outside a range of the clock value of the hardware clock plus and minus the estimation of dynamic error bound retrieved from the hardware counter.

System Description

Figure 1:
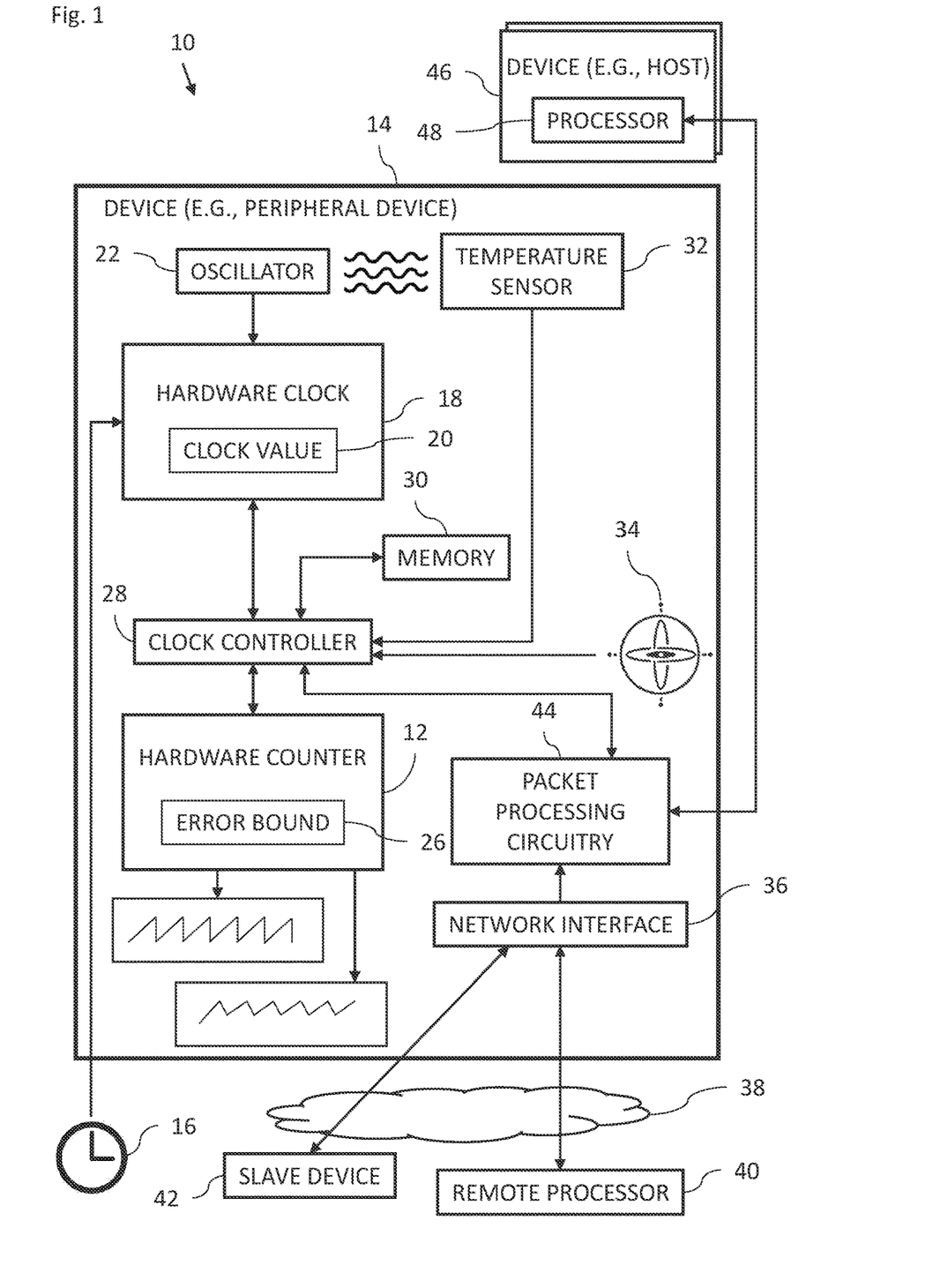
FIG. 1 is a block diagram view of computer system constructed and operative in accordance with an embodiment of the present invention.
Figure 2:
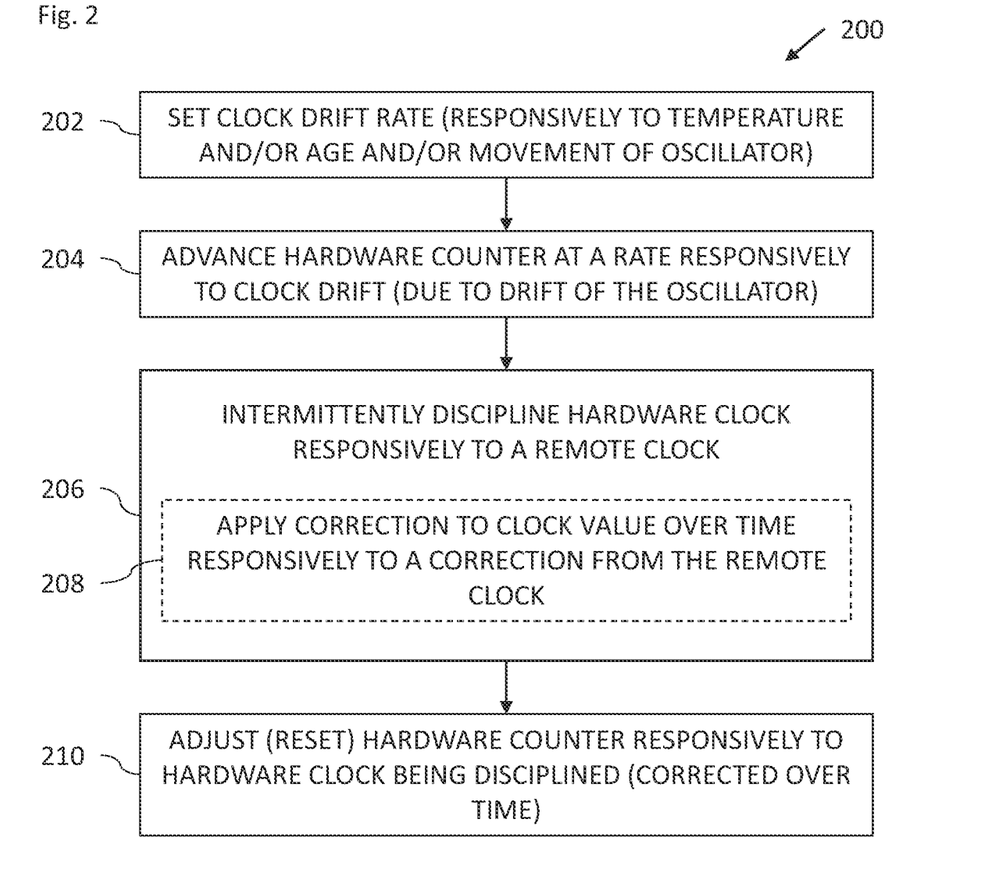
FIG. 2 is a flowchart including steps in a method of controlling a hardware counter in the system of FIG. 1.

Reference is now made to FIG. 1 and FIG. 2. FIG. 1 is a block diagram view of computer system 10 constructed and operative in accordance with an embodiment of the present invention. FIG. 2 is a flowchart 200 including steps in a method of controlling a hardware counter 12 in the system 10 of FIG. 1.

The computer system 10 includes a device 14. The device 14 may be any suitable processing device which includes a hardware clock 18 configured to maintain a clock value 20, which drifts and needs to be disciplined based on a remote clock 16. In some embodiments, the device 14 may be a peripheral device such as a network interface controller (NIC) or a smart NIC including a data processing unit (DPU). The device 14 may also include an oscillator 22 which outputs a signal configured to drive the hardware clock 18. The oscillator 22 is one source of drift of the clock value 20 from the remote clock 16.

The device 14 includes the hardware counter 12 configured to maintain an estimation of a dynamic error bound 26 of the clock value 20. The estimation of a dynamic error bound 26 provides an estimation of the current error, or drift, of the clock value 20 away from the remote clock 16. The device 14 also includes a clock controller 28, which is configured to control the hardware clock 18 and the hardware counter 12, and perform other functions related to the hardware clock 18 and/or the hardware counter 12, described in more detail below. The device 14 may include a memory 30 used by the clock controller 28.

In some embodiments, the device 14 includes a network interface 36 to send packets over a network 38 to a remote processor 40 or a slave device 42 (e.g., a device that receives clock values from the device 14 or any other suitable device), and receive packets over the network 38 from the remote processor 40 or the slave device 42. The device 14 may also include packet processing circuitry 44, which may include a physical layer (PHY) chip and a MAC chip (not shown) to process packets received over the network interface 36 or to process packets to be sent over the network interface 36. The device 14 may be connected to one or more other devices 46, such as a host device including a processor 48 via a suitable interface (not shown), such as a peripheral bus interface. The processor 48 may provide packets to the device 14 for processing, or receive processed packets from the device 14 via a suitable interface, such as a peripheral bus interface.

The temperature of the oscillator 22 may contribute to the drift of the oscillator 22 and may be used to determine how to adjust the hardware counter 12, described in more detail below. Therefore, in some embodiments, the device 14 includes a temperature sensor 32 configured to measure a temperature of the oscillator 22. The behavior of the oscillator 22 may also depend upon vibration of the oscillator 22. Therefore, in some embodiments, the device 14 includes an accelerometer 34, or other movement sensor, which is configured to measure movement (generally an average or standard deviation of acceleration). The movement is indicative of vibration of the oscillator 22, which may drift as a function of its (the oscillator's 22) vibration, for example. Therefore, the movement measurement may be used to determine how to adjust the hardware counter 12, described in more detail below. The age of the oscillator 22 may contribute to the drift of the oscillator 22 and may be used to determine how to adjust the hardware counter 12, described in more detail below. Therefore, in some embodiments, the age of the oscillator 22 may be derived by the clock controller 28 from a value stored in the memory 30.

In some embodiments, the clock controller 28 is configured to set a clock drift rate based on the drift of the oscillator 22 (block 202). The maximum drift of the oscillator 22 may be specified in the data sheet of the oscillator 22. In some embodiments, the clock controller 28 is configured to set or adjust the clock drift rate responsively to one or more other factors including: the temperature, age, and/or movement (e.g., vibration) of the oscillator 22. The data sheet of the oscillator 22 describe the behavior of the oscillator drift at different temperatures, vibrations, and/or ages. Alternatively, the behavior of the oscillator 22 at different temperatures, vibrations, or ages may be empirically determined. For example, the maximum drift may be measured in a laboratory under extreme temperature and/or vibration conditions.

The clock controller 28 is configured to advance the hardware counter 12 at a rate responsively to a clock drift (e.g., an estimated drift of the clock value 20) (block 204). In some embodiments, the clock controller 28 is configured to advance the hardware counter 12 at the rate responsively to a given drift of the oscillator 22. For example, if the estimated drift of the clock value is X nanoseconds per clock tick, then the hardware counter is incremented by X per clock tick. The duration of a clock tick may be defined to be any suitable time interval of the clock value 20. In some embodiments, the clock controller 28 is configured to advance the hardware counter 12 at the rate responsively to the given drift of the oscillator 22 and any one or more of the following factors (which may adjust the base-rate of the oscillator 22): the temperature of the oscillator 22, the age of the oscillator 22 (e.g., age from manufacture, or age from initially being turned on or last turned on), and/or the measured movement (e.g., vibration) provided by the accelerometer 34. The estimation of a dynamic error bound 26 increases at the rate (which may be adjusted over time responsively to such factors as temperature, movement, and/or age), and the estimation of a dynamic error bound 26 is intermittently reset or adjusted based on the hardware clock 18 being disciplined based on the remote clock 16, as described in more detail below.

The clock controller 28 is configured to intermittently discipline the hardware clock 18 responsively to the remote clock 16 (block 206). The clock controller 28 does not necessarily interact with the remote clock 16 but disciplines the hardware clock 18 based on data or packets received from the remote clock 16. In some embodiments, the clock controller 28 is configured to apply a correction to the clock value 20 over time responsively to a correction based on the clock value received from the remote clock 16 (block 208). For example, the difference between the clock value 20 and the remote clock 16 may be applied as an instant correction or over time. The clock controller 28 is configured to adjust the hardware counter 12 responsively to the hardware clock 18 being disciplined (block 210), as described in more detail below.

Figure 3A:
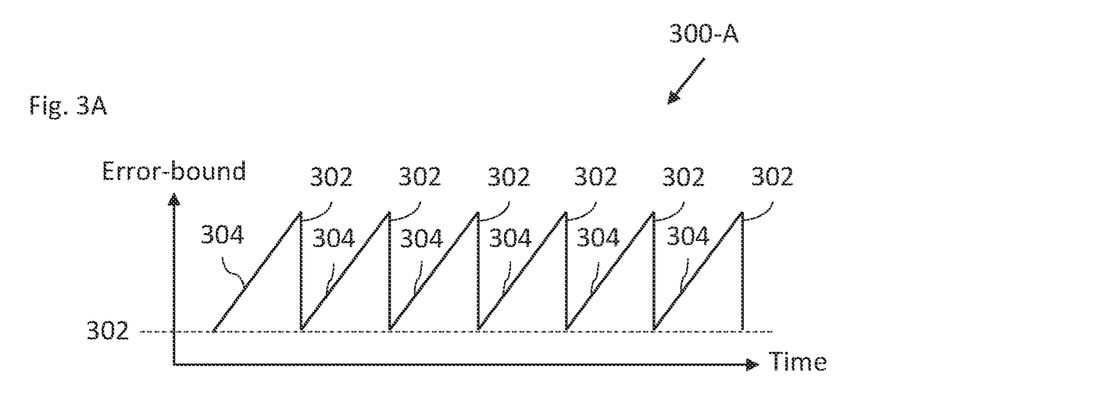
FIGS. 3A and 3B are graphs of error-bound against time in the system of FIG. 1.
Figure 3B:
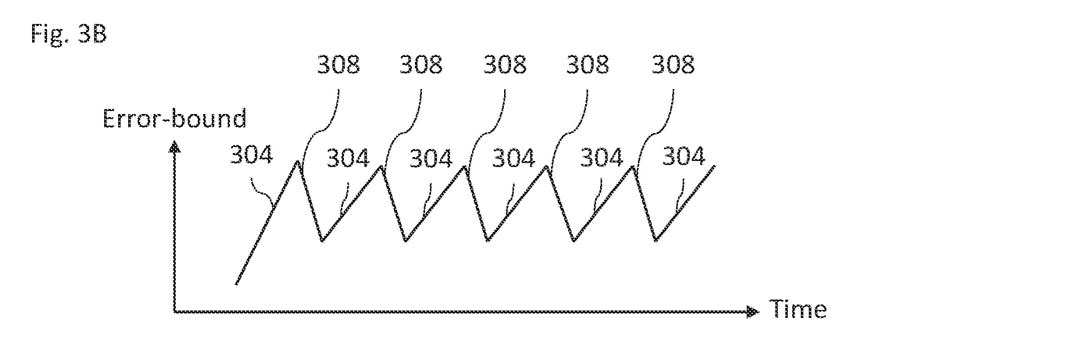

Reference is now made to FIGS. 3A and 3B, which are graphs 300-A, 300-B of error-bound against time in the system 10 of FIG. 1.

In some embodiments, when the clock value 20 is not corrected over time (i.e., the clock value 20 is corrected with an instant correction), the clock controller 28 is configured to reset the hardware counter 12 to a given value (e.g., to zero or to a value which represents the minimum drift of the clock value 20) responsively to the hardware clock 18 being disciplined. For example, if the estimated drift of the clock value is X nanoseconds per clock tick, then the hardware counter is incremented by X per clock tick. The value of the hardware counter may be reset (e.g., to a base value, such as Y) each time the hardware clock 18 is disciplined to the clock value of the remote clock 16. After each reset, the hardware counter 12 is incremented from the base value (e.g., of Y) by X per clock tick until the next reset. FIG. 3A shows the estimation of a dynamic error bound 26 increasing at a fixed rate (lines 304) and then being reset (lines 306) to a base value 302 each time the hardware clock 18 is disciplined.

In some embodiments, when the clock value 20 is corrected over time, the clock controller 28 is configured to adjust the hardware counter 12 over time responsively to the clock value 20 of the hardware clock 18 being corrected by the correction over time. In some cases where the hardware clock 18 is adjusted over time responsively to the clock value of the remote clock 16, the hardware counter 12 is decremented over time corresponding to the adjustment of the clock value 20 over time in addition to being incremented by X per tick. For example, if the hardware counter 12 has a value of P when the remote clock 16 is received, and the hardware clock 18 is adjusted over Q ticks of the hardware clock 18, then the hardware counter 12 is reduced, per tick, by:

$$\frac{P-Y}{Q} - X$$

FIG. 3B shows the estimation of a dynamic error bound 26 increasing at a fixed rate (lines 304) and then decreasing at a fixed rate (lines 308). Each line 308 corresponds to the hardware clock 18 being disciplined over time at a given rate while still considering the ongoing drift of the clock value 20 during the time period in which the hardware clock 18 is being disciplined.

The rate of changing the clock value 20 may depend on the method of clock discipline used (i.e., how the clock reference you want to track is obtained from the remote clock 16), for example, using the Synchronous Ethernet (SyncE) standard, or Precision Time Protocol (PTP), or if the hardware clock 18 is in holdover. Therefore, the clock controller 28 may be configured to adjust the hardware counter 12 (over time) responsively to the method used to obtain the remote clock 16.

In practice, some or all of these functions of the clock controller 28 may be combined in a single physical component or, alternatively, implemented using multiple physical components. These physical components may comprise hard-wired or programmable devices, or a combination of the two. In some embodiments, at least some of the functions of the clock controller 28 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory such as the memory 30.

Figure 4:
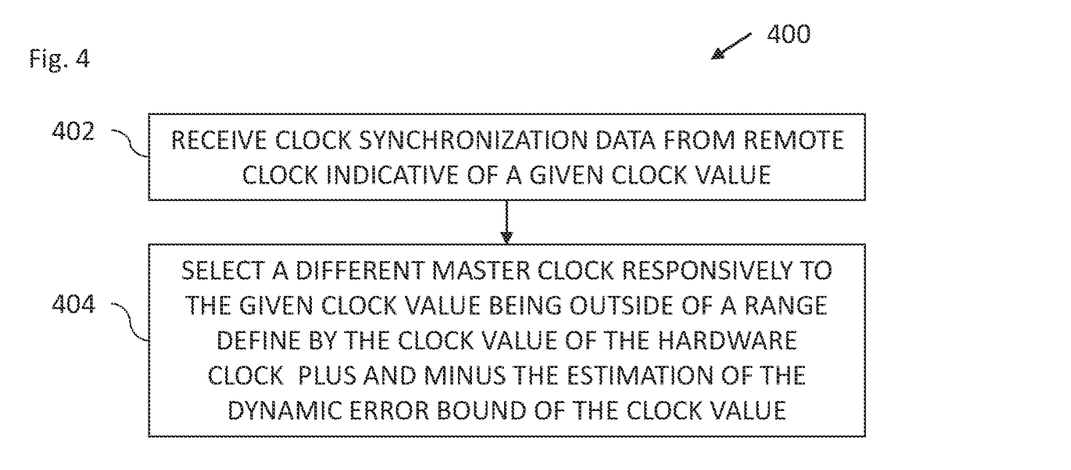
FIG. 4 is a flowchart including steps in a method of selecting a master clock in the system of FIG. 1.

Reference is now made to FIG. 4, which is a flowchart 400 including steps in a method of selecting a master clock in the system 10 of FIG. 1. In some embodiments, the clock controller 28 is configured to receive clock synchronization data from the remote clock 16 indicative of a given clock value to which to discipline the hardware clock 18 (block 402). It should be noted that the clock value received from the remote clock 16 generally needs to be adjusted for the time of flight (i.e., one-way delay) between the remote clock 16 and the device 14 yielding the given clock value (i.e., an adjusted master clock value). The clock controller 28 may be configured to select a different master clock (i.e., instead of the remote clock 16) responsively to the given clock value (i.e., the adjusted master clock value) being outside of a range defined by the clock value 20 of the hardware clock 18 plus and minus the estimation of a dynamic error bound 26 of the clock value 20 (block 404). For example, if the clock value 20 is X and the estimation of a dynamic error bound 26 is Y, then the range is from X–Y to X+Y.

Figure 5:
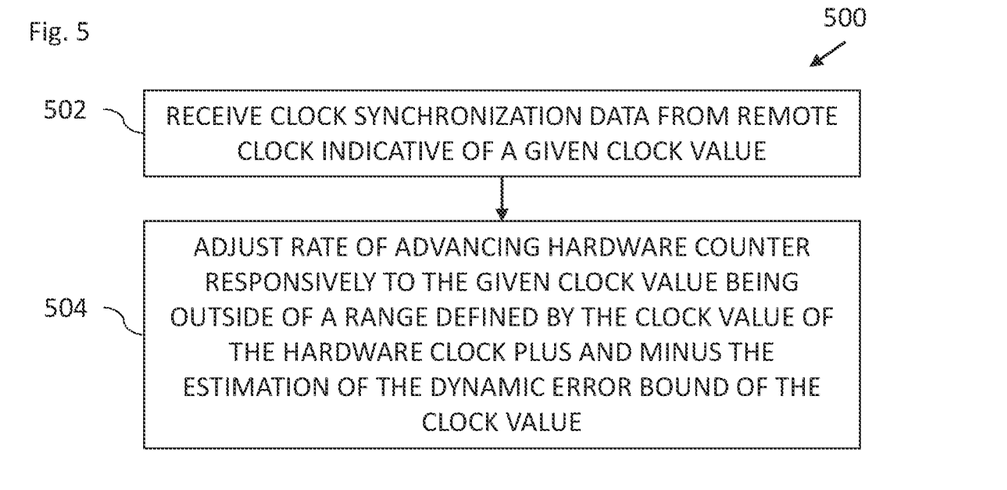
FIG. 5 is a flowchart including steps in a method of adjusting the rate of advancing a hardware counter in the system of FIG. 1.

Reference is now made to FIG. 5, which is a flowchart 500 including steps in a method of adjusting the rate of advancing the hardware counter 12 in the system 10 of FIG. 1. The clock controller 28 is configured to receive clock synchronization data from the remote clock 16 indicative of a given clock value to which to discipline the hardware clock 18 (block 502). It should be noted that the clock value received from the remote clock 16 generally needs to be adjusted for the time of flight (i.e., one-way delay) between the remote clock 16 and the device 14 yielding the given clock value (i.e., an adjusted master clock value). The clock controller 28 is configured to adjust the rate of advancing the hardware counter 12 responsively to the given clock value (i.e., the adjusted master clock value) being outside of a range defined by the clock value 20 of the hardware clock 18 plus and minus the estimation of the dynamic error bound 26 of the clock value 20 (block 504). For example, if the clock value 20 is X and the estimation of a dynamic error bound 26 is Y, then the range is from X-Y to X+Y. For example, if the given clock value is less than X-Y then the rate of incrementing the hardware counter 12 may be decreased, and if the given clock value is greater than X+Y, the rate of incrementing the hardware counter 12 may be increased.

Figure 6:
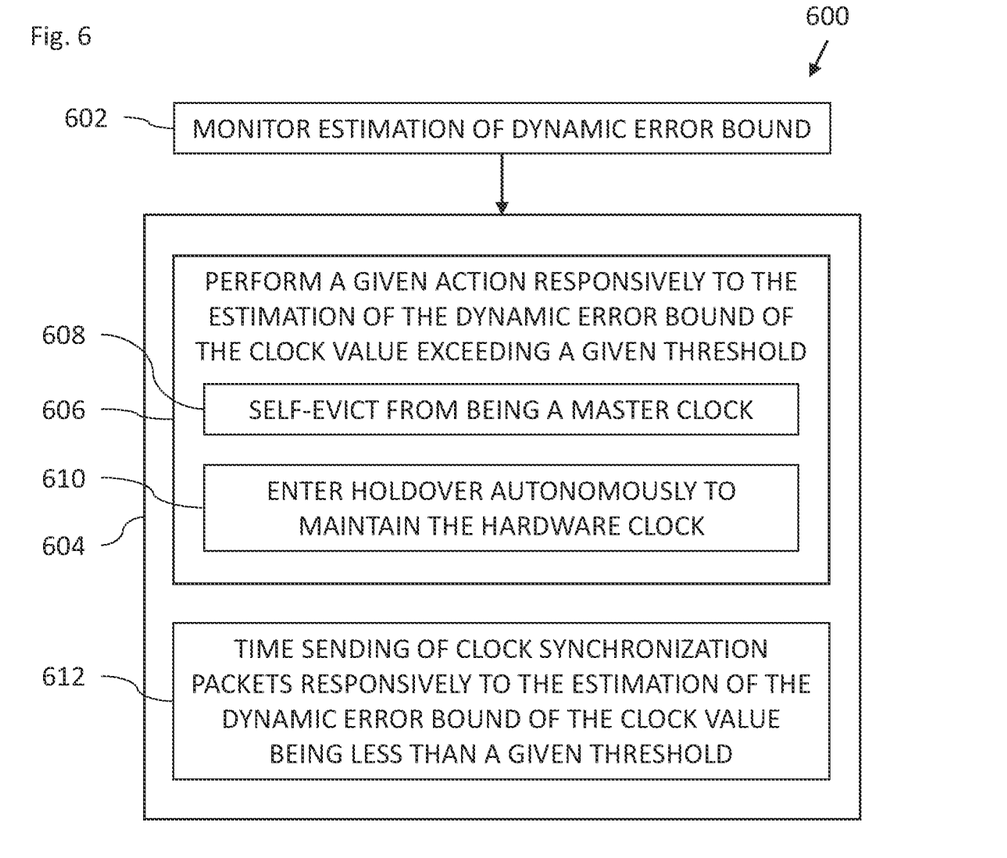
FIG. 6 is a flowchart including steps in a method of performing an action based on an error bound value exceeding a given threshold for use in the system of FIG. 1.

Reference is now made to FIG. 6, which is a flowchart 600 including steps in a method of performing an action based on the estimation of a dynamic error bound 26 exceeding a given threshold for use in the system 10 of FIG. 1.

The clock controller 28 is configured to monitor a value of the estimation of a dynamic error bound 26 (block 602). The clock controller 28 may be configured to perform one or more actions based on the monitoring (block 604).

In some embodiments, the clock controller 28 is configured to perform a given action responsively to the estimation of the dynamic error bound 26 of the clock value 20 exceeding a given threshold (block 606). In some embodiments, when the device 14 is acting as a master clock, the clock controller 28 is configured to self-evict from being a master clock responsively to the estimation of the dynamic error bound 26 of the clock value 20 exceeding the given threshold (block 608). In some embodiments, the clock controller 28 is configured to enter holdover autonomously to maintain the hardware clock 18 responsively to the estimation of the dynamic error bound 26 of the clock value 20 exceeding a given threshold (block 610).

In some embodiments, when the device 14 is acting as a master clock, the clock controller 28 is configured to time sending clock synchronization packets responsively to the estimation of the dynamic error bound 26 of the clock value 20 being less than a given threshold (block 612). In this manner, if the device 14 is acting as a master clock, the clock values 20 supplied to slave device(s) should be more accurate.

Figure 7:
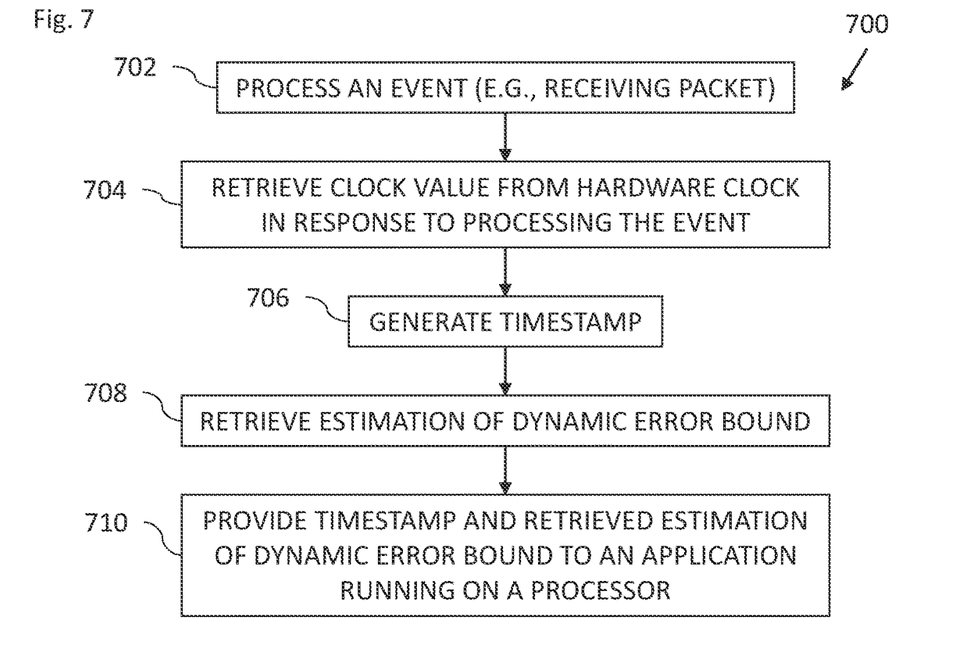
FIG. 7 is a flowchart including steps in a method of processing an event in the system of FIG. 1.

Reference is now made to FIG. 7, which is a flowchart 700 including steps in a method of processing an event in the system 10 of FIG. 1. The packet processing circuitry 44 is configured to process an event (block 702). In some embodiments, the network interface 36 is configured to receive a packet, wherein the event includes receiving the packet. The event may be any suitable event, for example, a packet being received, a packet being sent, a counter reaching/exceeding a given value, a counter that counts packets meeting a given criteria reaching/exceeding a given value, or a buffer exceeding a threshold. The packet processing circuitry 44 is configured to retrieve the clock value 20 from the hardware clock 18 (via the clock controller 28) in response to the processing of the event (block 704). The packet processing circuitry 44 is configured to generate a timestamp responsively to the retrieved clock value 20 (block 706). The packet processing circuitry 44 is configured to retrieve the estimation of the dynamic error bound 26 of the clock value 20 from the hardware counter 12 in response to the processing of the event (block 708). In some embodiments, the estimation of a dynamic error bound 26 and the clock value 20 may be retrieved atomically. The packet processing circuitry 44 is configured to provide the timestamp and the retrieved estimation of the dynamic error bound 26 to an application running on a processor, such as the processor 48 of the device 46 (e.g., host device) or the remote processor 40 (block 710) or processing core(s) of a DPU when the device 14 is configured as a DPU or Smart NIC.

Figure 8:
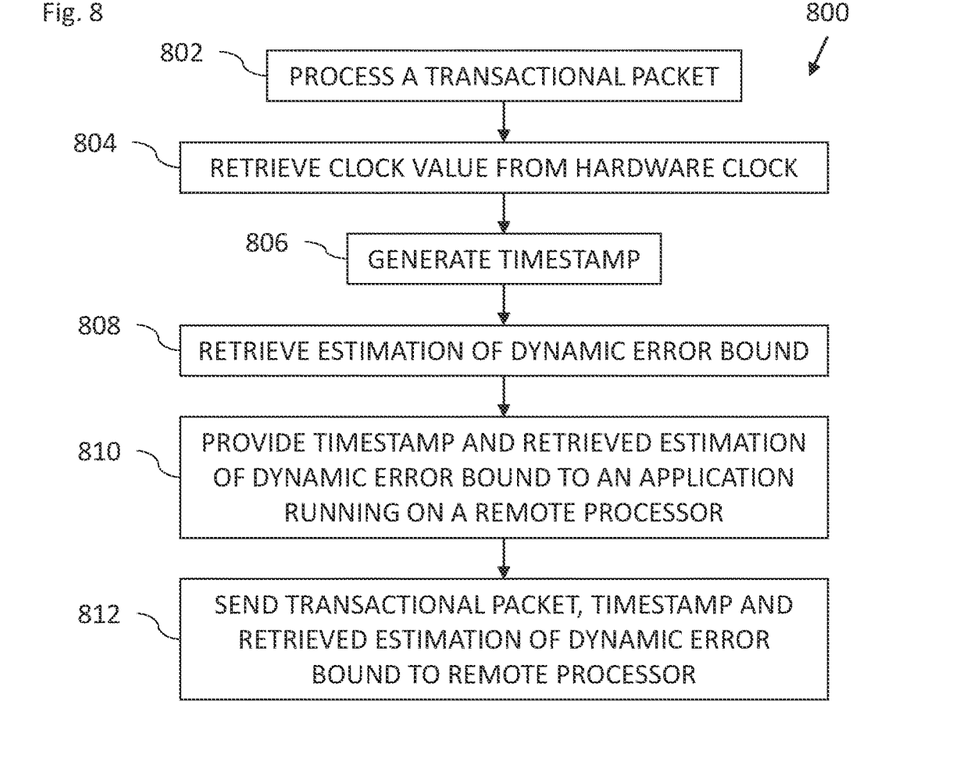
FIG. 8 is a flowchart including steps in a method of processing a transactional packet in the system of FIG. 1.

Reference is now made to FIG. 8, which is a flowchart 800 including steps in a method of processing a transactional packet in the system 10 of FIG. 1. The packet processing circuitry 44 is configured to process a transactional packet (block 802). The packet processing circuitry 44 is configured to retrieve the clock value 20 from the hardware clock 18 (block 804). The packet processing circuitry 44 is configured to generate a timestamp responsively to the retrieved clock value 20 (block 806). The packet processing circuitry 44 is configured to retrieve the estimation of the dynamic error bound 26 of the clock value 20 from the hardware counter 12 (block 808). In some embodiments, the estimation of a dynamic error bound 26 and the clock value 20 may be retrieved atomically. The packet processing circuitry 44 is configured to provide the timestamp and the retrieved estimation of the dynamic error bound 26 to an application configured to process the transactional packet on the remote processor 40 (block 810). The network interface 36 is configured to send the transactional packet, the timestamp, and the retrieved estimation of the dynamic error bound 26 to the remote processor 40 (block 812).

Figure 9:
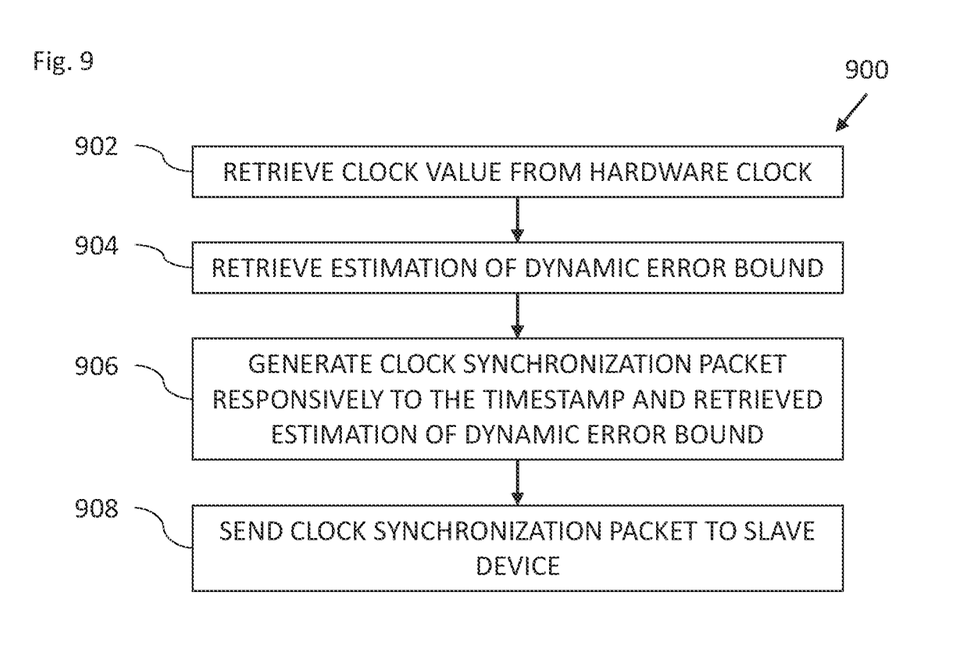
FIG. 9 is a flowchart including steps in a method of generating a clock synchronization packet in the system of FIG. 1.

Reference is now made to FIG. 9, which is a flowchart 900 including steps in a method of generating a clock synchronization packet in the system 10 of FIG. 1 when the clock controller 28 is acting as a master clock. The clock controller 28 is configured to retrieve the clock value 20 from the hardware clock 18 (block 902). The clock controller 28 is configured to retrieve the estimation of the dynamic error bound 26 of the clock value 20 from the hardware counter 12 (block 904). In some embodiments, the estimation of a dynamic error bound 26 and the clock value 20 may be retrieved atomically. The clock controller 28 is configured to generate a clock synchronization packet responsively to the retrieved clock value 20 and the retrieved estimation of the dynamic error bound 26 (block 906). In some embodiments, the clock synchronization packet includes the retrieved clock value 20 and the retrieved estimation of the dynamic error bound 26. The network interface 36 is configured to send the clock synchronization packet to slave device 42 (block 908).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A device, comprising:
   a hardware clock to maintain a clock value;
   a hardware counter to maintain an estimation of a dynamic error bound of the clock value; and
   a clock controller to:
     intermittently discipline the hardware clock in response to a remote clock;
     advance the hardware counter at a rate in response to a clock drift; and
     adjust the hardware counter in response to the hardware clock being disciplined.

2. The device according to claim 1, wherein the clock controller is configured to reset the hardware counter to a given value in response to the hardware clock being disciplined.

3. The device according to claim 1, wherein the clock controller is configured to: apply a correction to the clock value over time in response to a correction from the remote clock; and adjust the hardware counter over time in response to the hardware clock being corrected by the correction over time.

4. The device according to claim 3, wherein the clock controller is configured to adjust the hardware counter over time in response to a method used to obtain the remote clock.

5. The device according to claim 1, further comprising an oscillator to drive the hardware clock, wherein the clock controller is configured to advance the hardware counter at the rate in response to a given drift of the oscillator.

6. The device according to claim 5, further comprising a temperature sensor to measure a temperature of the oscillator, wherein the clock controller is configured to advance the hardware counter at the rate in response to the given drift of the oscillator and the temperature of the oscillator.

7. The device according to claim 5, wherein the clock controller is configured to advance the hardware counter at the rate in response to the given drift of the oscillator and e an age of the oscillator.

8. The device according to claim 5, further comprising an accelerometer to measure movement, wherein the clock controller is configured to advance the hardware counter at the rate in response to the given drift of the oscillator and the measured movement.

9. The device according to claim 1, further comprising packet processing circuitry to:
   process an event;
   retrieve the clock value from the hardware clock in response to the processing of the event;
   generate a timestamp in response to the retrieved clock value;
   retrieve the estimation of the dynamic error bound of the clock value from the hardware counter in response to the processing of the event; and
   provide the timestamp and the retrieved estimation of the dynamic error bound to an application running on a processor.

10. The device according to claim 9, further comprising a network interface to receive a packet, wherein the event includes receiving the packet.

11. The device according to claim 1, further comprising:
    packet processing circuitry to:
      process a transactional packet;
      retrieve the clock value from the hardware clock;
      generate a timestamp in response to the retrieved clock value;
      retrieve the estimation of the dynamic error bound of the clock value from the hardware counter; and
      provide the timestamp and the retrieved estimation of the dynamic error bound to an application configured to process the transactional packet on a remote processor; and
    a network interface to send the transactional packet, the timestamp, and the retrieved estimation of the dynamic error bound to the remote processor.

12. The device according to claim 1, wherein the clock controller is configured to perform a given action in response to the estimation of the dynamic error bound of the clock value exceeding a given threshold.

13. The device according to claim 1, wherein the clock controller is configured to:
    receive clock synchronization data from the remote clock indicative of a given clock value to which to discipline the hardware clock; and
    select a different master clock in response to the given clock value being outside of a range defined by the clock value of the hardware clock plus and minus the estimation of the dynamic error bound of the clock value.

14. The device according to claim 1, wherein the clock controller is configured to:
    receive clock synchronization data from the remote clock indicative of a given clock value to which to discipline the hardware clock; and
    adjust the rate of advancing the hardware counter in response to the given clock value being outside of a range defined by a clock value of a master clock plus and minus the estimation of the dynamic error bound of the clock value.

15. The device according to claim 1, wherein the clock controller is configured to time sending of clock synchronization packets in response to the estimation of the dynamic error bound of the clock value being less than a given threshold.

16. The device according to claim 1, wherein the clock controller is configured to self-evict from being a master clock in response to the estimation of the dynamic error bound of the clock value exceeding a given threshold.

17. The device according to claim 1, wherein the clock controller is configured to enter holdover autonomously to maintain the hardware clock in response to the estimation of the dynamic error bound of the clock value exceeding a given threshold.

18. The device according to claim 1, wherein the clock controller is configured to:
    retrieve the clock value from the hardware clock;
    retrieve the estimation of the dynamic error bound of the clock value from the hardware counter; and
    generate a clock synchronization packet in response to the retrieved clock value and the retrieved estimation of the dynamic error bound, the device further comprising a network interface configured to send the clock synchronization packet to a slave device.

19. A method, comprising:
maintaining a clock value of a hardware clock;
maintaining an estimation of a dynamic error bound of the clock value using a hardware counter;
intermittently disciplining the hardware clock in response to a remote clock;
advancing the hardware counter at a rate in response to a clock drift; and
adjusting the hardware counter in response to the hardware clock being disciplined.

20. A multi-host system, comprising:
multiple host devices comprising respective processors to run respective applications; and
a peripheral device to be connected to the multiple host devices, and comprising:
  a hardware clock to maintain a clock value;
  a hardware counter to maintain an estimation of a dynamic error bound of the clock value; and
  a clock controller to: intermittently discipline the hardware clock in response to a remote clock; advance the hardware counter at a rate in response to a clock drift; and adjust the hardware counter in response to the hardware clock being disciplined.

21. The system according to claim 20, wherein the peripheral device further comprises processing circuitry to:
process respective events;
retrieve respective clock values from the hardware clock in response to the processing of the respective events;
generate respective timestamps in response to the retrieved respective clock values;
retrieve respective estimations of the dynamic error bound of the respective clock values from the hardware counter in response to the processing of the respective events; and
provide the respective timestamps and the respective retrieved estimations of the dynamic error bound to the respective applications running on the respective processors of the respective hosts.

* * * * *